Patented Nov. 10, 1936

2,060,410

UNITED STATES PATENT OFFICE 2,060,410

SYNTHETIC RESINS

Gerhard Balle, Frankfort-on-the-Main-Hochst, Germany, assignor to I. G. Farbenindustrie Aktiengesellschaft, Frankfort-on-the-Main, Germany No Drawing. Application August 24, 1933, Serial No. 686,651. In Germany June 15, 1932

6 Claims. (Cl. 260—4)

This invention relates to new synthetic resins which are capable of being combined with drying oils.

I have found that new synthetic resins which are capable of being combined with drying oils are obtained by causing alkylene oxides to act upon condensation products from phenols and aldehydes of the novolak or resol-type. The reaction is performed at an elevated temperature, and preferably, in the presence of catalysts.

Phenol as well as cresols such as crude cresol can be used for the preparation of the starting material whereas formaldehyde, acetaldehyde and butyraldehyde are the most suitable aldehydes. Every known alkylene oxide such as ethylene oxide, butylene oxide or glycid alcohol of the formula:

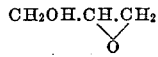

can be used.

The new condensation products are high molecular compounds of a resin- to wax- and fat-like character depending on the amount of the alkylene oxide introduced. They are characterized by the fact that the hydrogen atoms of the phenolic hydroxyl groups are substituted by, for instance, —CH₂.CH₂OH groups or

($n$ representing a whole number) groups. The lower substituted products are of an unaltered resin-like character whereas the higher substituted products are more wax- and fat-like and, finally, soluble in water. They are more or less colored and are soluble in benzene, alcohol and oil of turpentine. They are capable of being combined with drying oils and are, in consequence thereof, suitable raw materials for the preparation of lacquers.

The following examples serve to illustrate the invention, but they are not intended to limit it thereto, the parts being by weight:

(1) 108 parts of crude cresol are heated with 80 parts of formaldehyde of 30 per cent strength, 200 parts of water and 1 part of hydrochloric acid of 37 per cent strength for 3 hours while refluxing. The resin thus obtained is washed with water until neutral and freed from water by heating it to 130° C. to 140° C. under a reduced pressure. Thereupon ethylene oxide is introduced into the fused mass at a temperature of about 150° C. to about 170° C. until about 50 parts of ethylene oxide have been absorbed. The fused mass is then poured on a sheet metal. It represents a bright hard and odorless resin which is soluble in alcohol and benzene and is capable of being combined with drying oils such as linseed oil or wood oil and the stand oils obtained therefrom to form clear oil lacquers which are soluble in turpentine oil, benzene, benzine, toluene, xylene, naphtha and the like. The solutions thus obtained when having incorporated therein siccatives yield lacquers which are f to light and alkalies.

(2) 120 parts of a resinous condensation product of technical xylenol and formaldehyde are molten in an autoclave with the addition of 44 parts of ethylene oxide. The mixture is kept, while stirring, at about 120° C. to about 130° C. until the initial overpressure of 8 atmospheres over the normal atmospheric pressure has been reduced to 0 atmosphere. The resulting product can be freed from volatile ingredients by heating it under reduced pressure at 140° C. to 150° C. in order to give it a higher softening point. The new product can be combined with drying oils.

(3) To a melt of 200 parts of a novolak from cresol and formaldehyde are added 2 parts of a sodium hydroxide solution of 40° Bé. whereupon ethylene oxide is introduced at 140° C. to 200° C. until about 40 parts are absorbed. Upon cooling the product represents a resin-like slightly colored mass.

(4) 200 parts of a resol obtained from phenol and formaldehyde in the presence of alkali are mixed with 100 parts of ethylene oxide whereupon the mass is heated, while refluxing, until the ethylene oxide is taken up. The resulting product shows properties similar to the properties of the product described in Example 1.

(5) 112 parts of a resinous condensation product of phenol and acetaldehyde are molten in an autoclave with the addition of 58 parts of propylene oxide. The mixture is kept, while stirring, at about 100° C. to about 110° C. until the over-pressure which amounts to 6 atmospheres over the normal atmospheric pressure at the beginning is reduced to 0 atmosphere. There are obtained 170 parts of a resin which is easily soluble in drying oils.

I claim:

1. The synthetic products being condensation products of an α alkylene oxide and a phenol-aldehyde resin of the novolak or resol-type, characterized by the substitution of hydrogen atoms of the phenolic hydroxyl groups by hydroxyalkyl radicles, the products having a resin- to wax- and fat-like character and being capable of being combined with drying oils.

2. The synthetic products being condensation products of an α alkylene oxide and a phenol-formaldehyde resin of the novolak or resol-type, characterized by the substitution of hydrogen atoms of the phenolic hydroxyl groups by hydroxy-alkyl radicles, the products having a resin- to wax- and fat-like character and being capable of being combined with drying oils.

3. The synthetic products being condensation products of an α alkylene oxide and a cresol-formaldehyde resin of the novolak or resol-type, characterized by the substitution of hydrogen atoms of the phenolic hydroxyl groups by hydroxy-alkyl radicles, the products having a resin- to wax- and fat-like character and being combined with drying oils.

4. The synthetic products being condensation products of ethylene oxide and a phenol-aldehyde resin of the novolak or resol-type, characterized by the substitution of hydrogen atoms of the phenolic hydroxyl groups by hydroxy-alkyl radicles, the products having a resin- to wax- and fat-like character and being capable of being combined with drying oils.

5. The synthetic products being condensation products of ethylene oxide and a cresol-formaldehyde resin of the novolak or resol-type, characterized by the substitution of hydrogen atoms of the phenolic hydroxyl groups by hydroxy-alkyl radicles, the products having a resin- to wax- and fat-like character and capable of being combined with drying oils.

6. The process which comprises reacting a phenolic compound of the group consisting of cresol, xylenol, and phenol with formaldehyde to form a resin of the novolak or resol-type and then reacting the product in neutral condition with an alkylene oxide to form a resin which in soluble in benzene, alcohol, and oil of turpentine and capable of being combined with drying oils.

GERHARD BALLE.